United States Patent [19]

DeSordi et al.

[11] Patent Number: 4,553,287
[45] Date of Patent: Nov. 19, 1985

[54] DEVICE AND PROCESS FOR CLEANING SHRIMP AND THE LIKE

[76] Inventors: Marlette S. DeSordi; Pete DeSordi, III, both of 1100 N. Trenton, Ruston, La. 71270; Jan C. McCullin; Sidney G. McCullin, both of Rte. 2, Dubach, La. 71235

[21] Appl. No.: 506,904

[22] Filed: Jun. 23, 1983

[51] Int. Cl.⁴ ............................................. A22C 29/02
[52] U.S. Cl. ............................................. 17/48; 17/72
[58] Field of Search ................... 17/71, 72, 73, 66, 69, 17/48

[56] References Cited

U.S. PATENT DOCUMENTS

| | | | |
|---|---|---|---|
| 1,171,241 | 2/1916 | Potter | 17/69 |
| 2,039,850 | 5/1936 | Silaj. | |
| 2,552,450 | 5/1951 | Paoli | 17/69 |
| 2,561,359 | 7/1951 | Gorton. | |
| 2,594,205 | 4/1952 | Paoli | 17/72 X |
| 2,647,278 | 7/1950 | Weinberger. | |
| 2,648,094 | 8/1953 | Paoli | 17/69 |
| 2,792,590 | 5/1957 | Stone. | |
| 2,819,487 | 1/1958 | Joseph. | |
| 2,832,987 | 5/1958 | Di Camillo. | |
| 2,857,620 | 10/1958 | Joseph | 17/69 |
| 3,126,576 | 3/1964 | Johannesen. | |
| 3,178,765 | 4/1965 | Gorton. | |
| 3,271,814 | 9/1966 | Gorton. | |
| 3,353,207 | 11/1967 | Weinberger. | |
| 4,048,696 | 9/1977 | Maschio | 17/69 |

Primary Examiner—Willie G. Abercrombie

[57] ABSTRACT

A device for cleaning crustaceans having slender, elongated bodies includes an elongated body having a tapered portion at one end, a deheading portion at another end, and a handle adjacent to the deheading portion. The tapered portion has an arcuate section and is adapted for lengthwise insertion into the body of the crustacean through the channel that contains the sand vein of the crustacean, and is further adapted to rupture the shell of the crustacean upon insertion. The deheading portion includes a cutting edge that is perpendicular to the length of the body of the device. A deveining means is disposed on a side of the tapered portion that includes the inside of the arcuate section. The deveining means includes an elongated ridge, wherein a portion of the ridge adjacent to an end of the device is parallel to a bilateral plane which divides the body of the device, and another portion of the ridge is skewed to one or the other side of the plane. A process for cleaning crustaceans with the inventive device is also provided.

4 Claims, 9 Drawing Figures

DEVICE AND PROCESS FOR CLEANING SHRIMP AND THE LIKE

BACKGROUND OF THE INVENTION

This invention relates to a device for cleaning crustaceans having slender, elongated bodies, such as shrimp and crayfish.

Crustaceans such as shrimp and crayfish are curved from head to tail with legs located along the inside of the curve. They have a relatively hard outer shell and an alimentary canal, known as the sand vein, runs along the center line of the back just inside the shell. In order to prepare shrimp or crayfish for eating, the inedible portions, which include the head, the shell and the sand vein, must be removed. One way in which this is accomplished is by first cutting off the head with a knife or other sharp edge, followed by peeling the shell from the edible body and then slitting the back of the body with a knife and scraping out the sand vein. This is a time-consuming process.

The need for a tool to accomplish the efficient cleaning of shrimp has been recognized in the art. In U.S. Pat. No. 2,552,450, an attempt to provide such a tool is made. This tool includes a body having a prong portion which is shaped to pass lengthwise through the body of a shrimp to rupture the side wall of the body of the shrimp adjacent to the passageway containing the sand vein, in order to effect removal of the sand vein. The prong portion is connected to a wedge portion which, in practice, is also inserted into the shrimp to separate the shell from the body of the shrimp by a wedging action. Other prior art devices which have been provided for cleaning crustaceans are provided with built-in cutting edges for removing the crustacean's head.

The shrimp cleaning implements heretofor available in the art are deficient for a number of reasons. To begin with, the curvature of the prong portion intended to be inserted into the crustacean has been defined by an arc having a radius which is too large. In many instances, the curvature of the crustacean is greater than that of the implement, so that the crustacean must be straightened out before the implement can be inserted.

The disposition of built-in deheading portions on prior art devices has also been inadequate. Typically, these cutting edges have been formed on the devices between the handle and prong of the devices, and such arrangement can be awkward and inefficient.

The prior art devices are deficient for other reasons as well, including their inability to effectively dislodge and provide for the removal of the sand vein and the lack of a provision for firmly grasping the device.

Accordingly, it can be appreciated that there is a need in the art for an improved tool for cleaning shrimp and the like, and this need is satisfied by the present invention. The present invention overcomes the deficiencies of prior art devices and provides a highly efficient and effective means for cleaning crustaceans.

SUMMARY OF THE INVENTION

In accordance with the present invention, a device and process for cleaning crustaceans having slender, elongated bodies is provided. The device includes an elongated body having a tapered portion at one end, a deheading portion at another end, and a handle adjacent to the deheading portion. The tapered portion has an arcuate section and is adapted for lengthwise insertion into the body of the crustacean through the channel that contains the sand vein of the crustacean, and is further adapted to rupture the shell of the crustacean upon insertion. The deheading portion comprises a cutting edge that is perpendicular to the length of the body of the device.

A deveining means is also provided which is connected to a side of the tapered portion that comprises the inside of the arcuate section. The deveining means includes an elongated ridge, wherein a portion of the ridge which is adjacent to an end of the device is parallel to a bilateral plane which divides the body of the device and another portion of the ridge is skewed to one or the other side of the plane.

A process for cleaning crustaceans having slender, elongated bodies, using the inventive device, is also provided.

DESCRIPTION OF THE PREFERRED EMBODIMENTS

Figure 1:
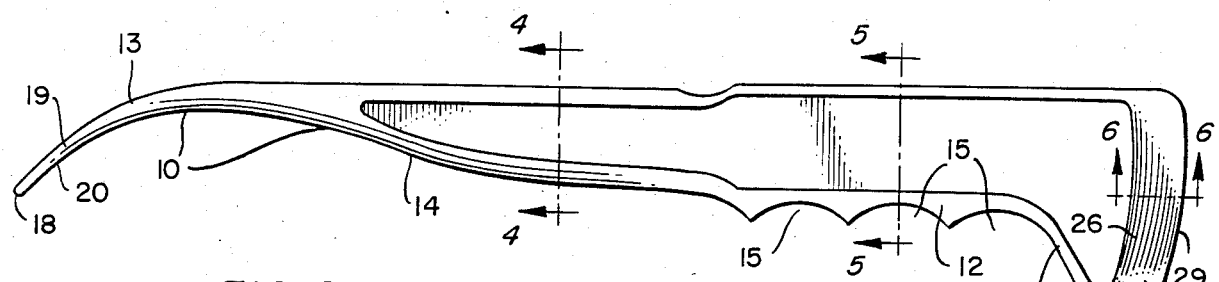
FIG. 1 is a side view of the device according to the present invention.
Figure 2:
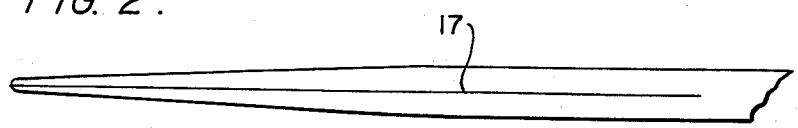
FIG. 2 is a top view of a portion of the device depicted in FIG. 1.
Figure 3:
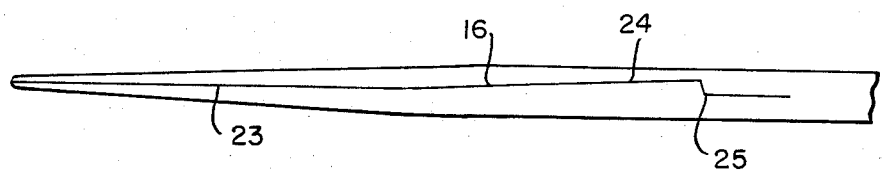
FIG. 3 is a bottom view of a portion of the device depicted in FIG. 1.
Figure 4:
FIG. 4 is a sectional view taken along line 4—4 of FIG. 1.
Figure 5:
FIG. 5 is a sectional view taken along line 5—5 of FIG. 1.

In accordance with the present invention, a device for cleaning crustaceans having slender, elongated bodies is depicted in FIG. 1. The device is generally elongated, and has a tapered portion, indicated generally at 10, at one end, and a deheading portion 11 at another end, with a handle 12 intermediate the ends of the device and provided adjacent to the deheading portion 11. As depicted in FIG. 1, the tapered portion has an arcuate shape 13 toward the end of the device and a wedge shape 14 adjacent to the arcuate shape. The handle portion 12 is provided with a plurality of indentations 15 which comprise a finger grip, and the cutting edge 29 of the deheading portion is perpendicular to the length of the device. A ridge 16, as depicted in FIG. 3, is provided along the bottom of the tapered section and serves to facilitate the deveining of the crustacean. A ridge 17 can also be provided on the top side of the tapered section, as depicted in FIG. 2.

The arcuate shape 13 of the tapered section preferably simulates the natural shape of the channel that contains the sand vein of the crustacean to be cleaned. The tip 18 of the device should be small enough to be inserted into the channel which contains the sand vein. It has been discovered that a preferred curvature of the arcuate section 13 is defined by an arc having a radius of between approximately 2.23 to 3.0 inches. In a particularly preferred embodiment, one side 19 of the arcuate section can have a curvature defined by an arc having a radius of approximately 3.0 inches, while another side 20 of the arcuate section can have a curvature defined by an arc having a radius of approximately 2.23 inches.

This particular embodiment is especially well-suited for the cleaning of shrimp, but it can be used efficiently in the cleaning of crayfish as well. When a device having these measurements is used, it may not be necessary to straighten the crustacean before the device is inserted.

Figure 9:
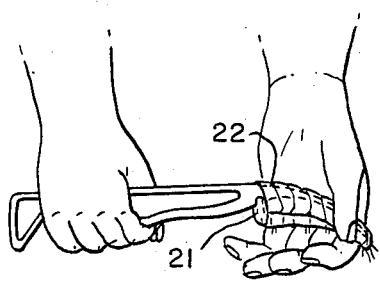

Immediately following the arcuate section 13 is the wedged section 14. The wedged section can take a number of shapes, as long as the total cross-sectional area of the wedge increases as the wedge progresses from the arcuate section to the rear of the device. In the device depicted in the drawings, the wedge increases moderately in cross-sectional area, and is adapted to be received in the crustacean, as depicted in FIG. 9, so that the body portion 21 is separated from the shell 22 by a wedging action.

As depicted in FIG. 2, a ridge 17 can be provided along the top side of the tapered portion 10. Preferably, this ridge will be sharpened to facilitate the cutting of the edible body of the crustacean above the channel which contains the sand vein.

In FIG. 3, the partially skewed ridge 16 is depicted. It is disposed on a side of the tapered portion 10 that is closest to the center of a circle defining the arc of arcuate section 13, i.e., it is disposed on a side of the tapered section that includes the inside of the arcuate section. A portion of the ridge 23 is substantially parallel to a bilateral plane which divides the body of the device, and another portion 24 is skewed, the ridge deviating to one side of the bilateral plane. It will be readily apparent that the skewed section 24 could deviate to the other side of the bilateral plane and have the same effect. In a preferred embodiment, it has been found that the degree by which the skewed portion 24 deviates from the bilateral plane can be 2.5° to 3°. In FIG. 3, the skewed portion terminates at a point 25.

It has been found that the skewing of the ridge 16 facilitates the dislodging and removal of the sand vein of the crustacean. The skewed portion serves to dislodge the sand vein from the channel which contains it, and this greatly facilitates the sand vein's removal. Without the skewing of the ridge 16, the sand vein can remain securely in place in the channel. It is noted that the dislodging action of the ridge 16 occurs when the tip 18 is inserted in and/or removed from within the channel just above the sand vein.

While the tapered section 10 has been described as having an arcuate section 13 and a wedge section 14, it is noted that these sections of tapered portion 10 may overlap. Thus, as depicted in FIG. 1, it can be seen that a section at which sections 13 and 14 meet is both arcuate and wedge shaped.

Figure 6:
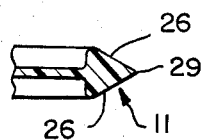
FIG. 6 is a sectional view taken along line 6—6 of FIG. 1.

The deheading portion 11 can be of any shape which is suitable to sever the head of the crustacean from its body. In the preferred embodiment depicted in FIG. 1 and FIG. 6, the deheading portion is wedge shaped in which the sides 26 are at an angle of 60° relative to each other. Generally, the cutting edge 11 is perpendicular to the length of the device. By this arrangement, and by providing the extended butt portion 27 between the handle 12 and deheading portion 11, a substantial force can be exerted to the crustacean with efficiency and little effort. Also, by providing the deheading portion at the end of the device, the tapered end 10 does not interfere with the deheading operation, as it might if the deheading portion were disposed along a midsection of the device and if crustacean parts prevented the entire length of the device to be adjacent to a cutting table.

The handling of the device is further facilitated by the finger grip 15. Many different configurations, besides that depicted in FIG. 1, can suffice. The finger grip means not only enables the device to be gripped more securely, but also enables the user to orient the device by tactile means. Moreover, the device can be used for the deheading, cutting and vein dislodging operations without a need for removing the fingers from the gripping portion or changing the grip of the user. This results in a more efficient operation.

The device should be composed of a rigid substance which is capable of being formed into a durable cutting edge. Many tough, rigid plastics, such as acrylonitrile-butadiene-styrene resins and high impact polystyrenes, can be suitable in the practice of the invention. Of course, metals and hardwoods, as well as other substances, could be used. It will also be readily apparent that the device could be composed of parts fixedly connected, or can be a single, unitary piece.

Figure 7:
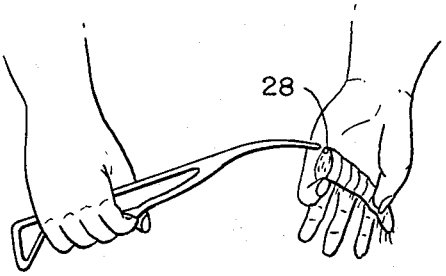
FIGS. 7 through 9 are perspective views illustrating the use of the device in the process according to the invention.

In use, a crustacean can be placed on a cutting surface, such as a flat table. To remove the head, the device is gripped as depicted in FIG. 7 and the cutting edge 29 is thrust through the crustacean, just below the head, in a pounding action. Of course, several crustaceans could be deheaded at once, before further cleaning is effected, or each crustacean can be deheaded and completely cleaned individually. The deheading is greatly facilitated by the arrangement of the cutting edge at the end of the device, whereby considerable downward force can be efficiently administered with little effort and great accuracy. Importantly, the grip of the user does not need to be rearranged between the deheading operation and the other cleaning steps.

Figure 8:
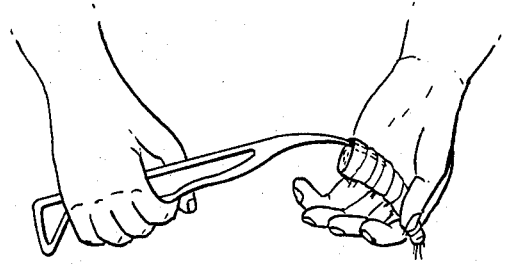

The use of the device in the execution of the other cleaning steps is illustrated in FIGS. 7 to 9. In FIG. 7, the tip of the device is being aligned for insertion into the channel 28 which contains the sand vein of the crustacean. After the tip has been satisfactorily aligned, it is inserted into the channel, as depicted in FIG. 8. Insertion of the device is continued, as depicted in FIG. 9, so that the wedged section 14 is introduced between the shell 22 and edible body 21 of the crustacean, whereby a wedging action serves to rupture the shell of the crustacean and dislodge the edible portion 13, the portion of the body of the crustacean above the sand vein is ruptured and, as insertion is continued, the skewed portion 24 of the ridge 16 serves to dislodge the sand vein from the channel. When the body of the crustacean is removed from the shell, the sand vein is usually totally removed therefrom, but it may be simply dislodged or partially dislodged, whereby complete removal can be readily effected by pulling on the dislodged portion or subjecting the dislodged portion to water pressure in a washing step.

Having thus described the present invention in terms of particular embodiments, it will be readily apparent to those having ordinary skill in the art that numerous modifications can be made to these embodiments without deviating from the spirit and intended scope of the invention.

We claim:

1. A device for cleaning crustaceans having slender, elongated bodies, the device comprising an elongated body having a tapered portion at one end, a deheading portion at another end and a handle adjacent said deheading portion, wherein said tapered portion comprises an arcuate section and is adapted for lengthwise insertion into the body of said crustacean through the channel which contains the sand vein of said crustacean to thus sever the body of the crustacean adjacent said channel and rupture the shell of said crustacean, and wherein said deheading portion comprises a cutting edge which is substantially perpendicular to the length of said body of the device.

2. The device according to claim 1, further comprising a butt extending between said handle and said deheading portion.

3. The device according to claim 1, wherein said handle is provided with a finger grip.

4. A process for cleaning crustanceans having slender, elongated bodies comprising the steps of grasping a device that comprises an elongated body having a tapered portion at one end, a deheading portion at another end and a handle adjacent said deheading portion, wherein said tapered portion comprises an arcuate section and is adapted for lengthwise insertion into the body of said crustacean through the channel that contains the said vein of said crustacean to thus sever the body of the crustacean adjacent said channel and rupture the shell of said crustacean, and wherein said deheading portion comprises a cutting edge which is substantially perpendicular to the length of said body of the device, deheading said crustacean with said deheading portion, and inserting said tapered portion into the body of said crustacean through said channel to thus sever the body of the crustacean adjacent said channel, rupture the shell of said crustacean and removed said body of said crustacean from said shell.

* * * * *